(No Model.)

J. M. STARR.
SPOKE WASHER FOR VEHICLE WHEELS.

No. 260,428. Patented July 4, 1882.

Witnesses:
W. J. Dennis
Oscar A. Lott

Inventor.
James M. Starr

UNITED STATES PATENT OFFICE.

JAMES M. STARR, OF RICHMOND, INDIANA.

SPOKE-WASHER FOR VEHICLE-WHEELS.

SPECIFICATION forming part of Letters Patent No. 260,428, dated July 4, 1882.

Application filed March 17, 1882. (No model.)

*To all whom it may concern:*

Be it known that I, JAMES M. STARR, a citizen of the United States, residing at Richmond, in Wayne county, and State of Indiana, have invented certain new and useful Improvements in Wheels for Vehicles, of which the following is a specification.

My invention relates to an improved method of arranging the joint where the spoke enters the felly.

My invention consists in the employment of a metallic washer or bearing fitting the shoulder of the tenon of the spoke, the sides of the washer being turned up in form to fit the inner edge of the felly, thus forming at the same time a clip or clamp embracing the sides of the felly to prevent splitting while the spokes are driven or by subsequent use. The body or base of the washer forms a bearing for the shoulder of the spoke at the end which enters the felly, where it comes in contact with the felly, and prevents abrasion of the shoulder of the spoke, as well as any indentation of the surface of the felly, either in the manufacture or use of the wheel.

Figure 1:
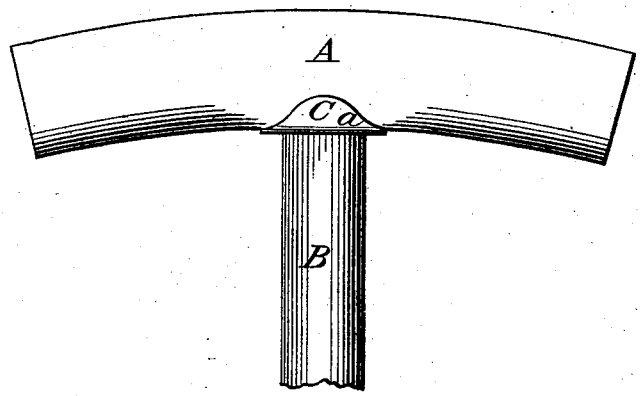
Figure 2:
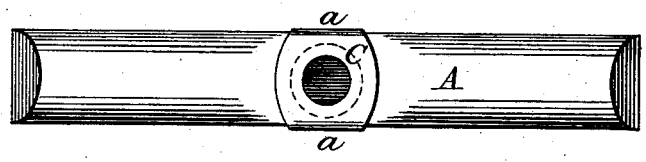

In the drawings which accompany this specification, forming a part thereof, Figure 1 is a view embracing a section of the felly and spoke of an ordinary wagon-wheel, showing the washer or clip in position. Fig. 2 is a view of the washer, showing the edges turned up in the form of a clamp or clip.

Similar letters refer to similar parts in the drawings.

In Fig. 1, A represents the felly, and B the spoke, being sectional portions of an ordinary wagon-wheel.

C, Fig. 2, is a circular metallic plate of any suitable thickness and diameter, having a hole in the center of a size to correspond with the size of the tenon on the spoke to be used, and having its edges on opposite sides turned up, as shown at *a a*, Fig. 2, in proper form to fit the inner portion of the felly at the point where the tenon of the spoke enters the same.

It will be seen that the washer C, when in position, acts as a bearing for the shoulder of the tenon of the spoke at the point of contact with the felly, preventing any indentation of the under surface of the felly by the end pressure of the spoke, while the edges *a a* serve as a clamp or support to sides of the felly to prevent the same from splitting. The shoulder of the tenon of the spoke being thus provided with a solid bearing, the abrasion of the end of the spoke is prevented when in use, the surface of the felly is also protected and strengthened, and the liability of the spoke becoming loose in the felly by use is done away. The operation of the washer C, with its curved edges, is, first, to form a perfect bearing for and between the shoulder of the spoke B and the surface of the felly A at their point of contact; and, second, to act by means of its curved edges as side supports to the felly when the tenon of the spoke enters the same.

Having fully described my said invention, what I claim as my said improvement is—

The circular plate or washer C, having a hole in the center, and having its opposite edges, *a a*, turned up at right angles with the plane of the face thereof, as an article of manufacture.

JAMES M. STARR.

Witnesses:
W. T. DENNIS,
O. A. LOTT.